UNITED STATES PATENT OFFICE.

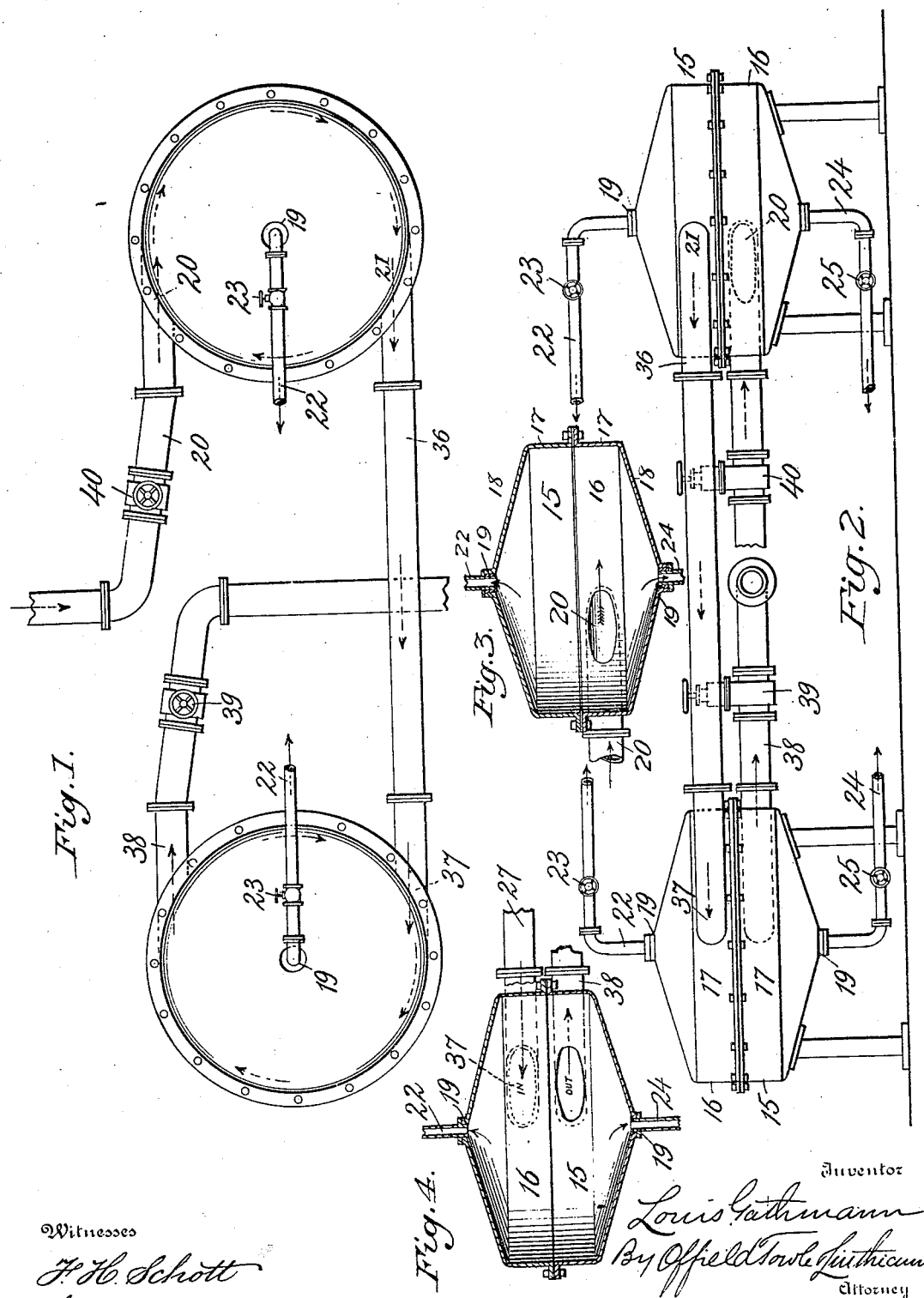

LOUIS GATHMANN, OF WASHINGTON, DISTRICT OF COLUMBIA, ASSIGNOR TO GEORGE WHITMAN McMULLEN, OF PICTON, CANADA.

PROCESS OF PURIFYING WATER.

SPECIFICATION forming part of Letters Patent No. 660,214, dated October 23, 1900.

Application filed September 16, 1899. Serial No. 730,723. (No specimens.)

*To all whom it may concern:*

Be it known that I, LOUIS GATHMANN, of Washington, in the District of Columbia, have invented certain new and useful Improvements in Systems of Purifying Water, of which the following is a specification.

This invention relates to a system of purifying water and comprehends a treatment or succession of treatments whereby all solid impurities, whether organic or inorganic, are completely separated and removed from the liquid.

My invention is capable of being applied to the purification of water in large or small bodies and may be adapted to the simple operation of purifying a supply of water for individual or domestic use or to the larger and more comprehensive operations of purifying water of a complete water system for supplying cities or towns.

My invention is furthermore applicable to the purification of water as it passes through the mains employed in a system of water distribution and without interruption of the supply or substantial diminution of the pressure, and the operations hereinafter described, or at least the principal ones, are carried out by the aid of the distributing pressure, thus rendering the system easily applied and very economical.

More particularly stated, my invention in its most comprehensive form includes the following treatments: First, the mechanical separation of the solid impurities having a specific gravity varying from the specific gravity of the liquid under treatment, which operation is performed by generating within a body of water vortical motion, which may be imparted to the body by passing it under pressure through a separating-chamber having curved walls, the water being delivered tangentially into said chamber under static or other pressure and the impurities being separated out and removed at one exit, while the purified water escapes at a separate exit, and, second, in a subsequent treatment or treatments of the water for the removal of any remaining impurities which may have escaped the first purification and which also preferably consists in imparting to the body of water a rotary motion, whereby centripetal force is developed and the solid impurities varying in specific gravity from that of the liquid are separated out and removed.

In carrying out my invention I preferably make use of the apparatus shown in the accompanying drawings and consisting of a separating-chamber having curved walls provided with a tangential inlet for the water, axial outlets for the impurities, and a peripheral outlet for the purified water. Such an apparatus may be connected into the main, the inlet being connected to the pressure side and the outlet to the delivery side of such main. For the purpose of convenience of application and repair such purifier may be located within a branch or by-pass provided with controlling-valves, so that the purifier may be cut off from the main or connected therewith at pleasure.

The second operation is preferably performed with an apparatus such as above described for use in carrying out the first treatment, but differently arranged, so as to produce a modified action, as hereinafter more particularly described.

In the drawings, Figure 1 is a plan view of a complete apparatus for subjecting the water to the two treatments above described. Fig. 2 is a side elevation of the same. Fig. 3 is a transverse sectional elevation of the chamber in which the primary separation is effected, and Fig. 4 a transverse sectional elevation of the chamber in which the secondary separation is performed.

I will first describe the apparatus and then its method of operation.

The primary treatment is carried out in a chamber preferably consisting of two similar vessels 15 16, each of which may be cast integral or in sections. Each of said vessels has a cylindrical body portion 17, with a frusto-conical side 18, terminating at its apex in a discharge-orifice 19. In the cylindrical wall of the primary separating vessel is a tangential inlet, (indicated at 20,) which, as shown in Figs. 1 and 2, is connected to the lowermost vessel 16, the vessel being placed in such position that its axis is vertical. The vessel 15 has a peripheral discharge 21. To the axial discharge-outlet 19 of the vessel 15 is connected a valve-controlled discharge-pipe 22, the valve being marked 23, and to the lower discharge-outlet 19 is connected a similar discharge-pipe 24, provided with a valve at 25. The discharge-outlet 21 is connected by a pipe 36 with a second chamber, wherein the secondary separation is effected. This secondary chamber is constructed identically like the primary separating chamber or vessel, but is differently arranged—that is to say, the positions of the vessels 15 and 16 are reversed, and to indicate such reversal I have indicated them by the same reference-numeral, but have marked the inlet and outlet with new reference-numerals. The tangential inlet in the case of the secondary apparatus is marked 37 and is connected to the cylindrical body-wall of the upper vessel 16, as shown at the left of the view Fig. 2, while the outlet-pipe (marked 38) is connected to the cylindrical body-wall of the lower section of the vessel (marked 15) and is provided with a controlling-valve 39. Axial outlets for the separated impurities are applied in the same positions and having the same connections as in the primary separator.

The purpose of constructing the separators as above described is to facilitate their reversal and avoid cost. It will be seen by reference to Figs. 3 and 4 that the vessels 15 16 are identical in construction, but are merely reversed as to position.

I will first describe the operation of the complete apparatus as shown in Figs. 1 and 2.

Assuming that the inlet 20, which is provided with a valve 40, is connected to a water-main or to a branch or by-pass thereof and that water is being forced through said main either by pumps or by static pressure, the water on entering through the tangential inlet-pipe 20 will be delivered against the cylindrical portion of the vessel 16 and will form into a rotary current whose speed will be proportional to the pressure and the rate of consumption. Water being a dense and practically-inelastic body with a specific gravity higher than the impurities carried thereby when delivered under pressure into a chamber of the form described will form a dense and practically-impenetrable moving mass against the peripheral wall of such chamber. The suspended impurities, whether organic or inorganic and such as pebbles, sand, silt, or other clayey or earthy material or vegetable or animal remains, will tend toward the zone of least resistance. The heavier impurities—such as sand, pebbles, or other earthy or mineral matters—will, obeying the law of gravity, seek the lower portion of the separator and will find exit through the bottom discharge-orifice. Other impurities having a less specific gravity than water and partaking of the rotary motion of the mass will also seek the interior of the whirling body, being the zone of least resistance, but will pursue an upward trend and find escape through the upper discharge-orifice. The purified water is preferably removed or allowed to escape at a peripheral outlet, such as 21, arranged at a distant point in the wall of the separator from the inlet and at a higher level. As shown at the right of the views Figs. 1 and 2, the outlet is arranged at a point approximately diametrically opposite the inlet and in a plane parallel to but above the outlet. By reason of this arrangement the current of liquid will perform one or more complete revolutions within the separator before reaching the outlet and will issue therefrom purified of all the heavier impurities and in such condition would be commonly considered potable. It may be, however, that some of the impurities, and particularly the lighter ones, carried by the water will not be separated by the primary treatment. To remove all such impurities, I preferably treat the current of water to a final separation in a second separator, which, as before described, is connected to the first separator. The current enters the second chamber tangentially and preferably in the upper portion thereof, being withdrawn at a lower level. As the impurities reaching this chamber will probably be of a light flocculent nature, they will readily pass out through the upper exit in close proximity to the point of inlet. Any heavy particles having a normal specific gravity greater than water will seek the lower portion of the separator and find exit through the bottom outlet. The now thoroughly-purified water will issue from the lower side connection 38 and may be delivered into the distribution-main if the system be applied to a large plant, or if to a smaller plant may be drawn off directly for consumption.

I will now call attention to and emphasize some of the features of my invention which have only been referred to incidentally.

In the first place I may remark that my system is intended to operate in conjunction with a flowing current of water the movement of which may be produced by pressure or by suction. When operating by pressure, the latter may be produced by pumps, or it may be static pressure. When the static pressure is low, it may be supplemented by pumps to either force or suck the water through the separators. I may further remark that the pressures necessary to produce a proper distribution of the water will be adequate to the operation of my system, which will not materially lower such pressure. The only diminution of pressure will be due to the lengthening of the path of the current of water and to the small loss occasioned by drawing off the impurities. The pipes through which the impurities are withdrawn are provided with valves, and I contemplate leaving these discharge-pipes open, so as to permit of the constant escape of a small stream of water, so as to carry off the impurities. This loss will not be excessive and will depend as to volume upon the quantity of impurities to be carried away. Instead of the open discharge for the impurities sediment or settling chambers may be used, connected to the discharge-outlets, and the sediment removed periodically without wasting water or diminishing its pressure.

My system, it will be observed, is a closed pressure system and is to be distinguished from those methods, such as filtration, in which gravity alone is operative. In my system the elemental action of centripetal force is the essential and leading characteristic, and this force is or may be developed by the distributing pressure alone and without the use of apparatus having movable parts and also with the simplest form of apparatus, eschewing deflectors, shelves, agitators, or other mechanical appliances, save only a modification of the form and connection of the water-passages sufficient to produce a rotary or gyratory movement of the water, developing centrifugal force.

My apparatus constitutes practically an integral or continuous part of a water-main, is automatically operated as an apparatus, and requires but very slight supervision or attendance.

I have described my system in its complete form as comprising the use of a primary centripetal separator and a secondary centripetal separator; but obviously the primary separator might be used alone. Obviously, also, where the water is impregnated with a large percentage of suspended impurities or contains a large percentage of animal organisms the operations of centrifugal separation may be repeated as frequently as necessary to effect purification. The form, materials of construction, and arrangement and combinations of parts are therefore capable of almost indefinite variations to adapt them to the multitude of situations in which the invention may be applied. The apparatus is capable of great variation as to size and material and operates upon the same principal whether applied to a service-pipe at the end of a system of water distribution or to the main at the inlet end of such system.

I make no claim in this present application to the apparatus herein set forth *per se*, as the same forms the subject-matter of a separate application filed by me January 8, 1900, Serial No. 771.

I claim—

1. The herein-described treatment of water for removing impurities therefrom, which consists in passing a body of water through a closed chamber whereby a vortical action is developed therein, and the impurities separated therefrom and drawing off the separated impurities at each end of the axis of the vortex while the purified water escapes from the periphery thereof, substantially as described.

2. The herein-described treatment of water for the separation of impurities therefrom which consists in delivering the same tangentially under pressure into a vessel provided with circular side walls whereby a vortical action is developed in the body of water and the impurities are separated therefrom and drawing off the separated impurities at the ends of the axis of the vortex and the purified water from the periphery, substantially as described.

In testimony whereof I affix my signature in presence of two witnesses.

LOUIS GATHMANN.

Witnesses:
EMIL GATHMANN,
N. CURTIS LAMMOND.